United States Patent
Yamashita et al.

(10) Patent No.: US 9,858,511 B2
(45) Date of Patent: Jan. 2, 2018

(54) PRINTING DEVICE AND PRINTING METHOD

(71) Applicant: SEIKO EPSON CORPORATION, Tokyo (JP)

(72) Inventors: Norihiro Yamashita, Shiojiri (JP); Sumito Anzai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/075,760

(22) Filed: Mar. 21, 2016

(65) Prior Publication Data

US 2016/0292546 A1 Oct. 6, 2016

(30) Foreign Application Priority Data

Apr. 1, 2015 (JP) ................................. 2015-074865

(51) Int. Cl.
*G06K 15/02* (2006.01)
*B41J 3/407* (2006.01)

(52) U.S. Cl.
CPC ........ *G06K 15/1843* (2013.01); *B41J 3/4078* (2013.01); *G06K 15/021* (2013.01); *G06K 2215/0057* (2013.01); *G06K 2215/0094* (2013.01); *G06K 2215/101* (2013.01)

(58) Field of Classification Search
USPC ......................................................... 358/1.2
See application file for complete search history.

(56) References Cited

U.S. PATENT DOCUMENTS

| 4,829,339 A * | 5/1989 | Dwyer ................. G03B 15/003 348/175 |
| 5,030,986 A * | 7/1991 | Dwyer, III ........... H04N 1/1004 348/104 |
| 9,292,773 B2 * | 3/2016 | Ohara .................... G06F 3/1204 |
| 2009/0310100 A1* | 12/2009 | Kondo .................. G03B 17/48 353/122 |
| 2014/0026769 A1* | 1/2014 | Miller .................. B41F 17/006 101/35 |
| 2014/0026773 A1* | 1/2014 | Miller .................. A43B 3/0078 101/485 |

(Continued)

FOREIGN PATENT DOCUMENTS

| JP | 2006-069104 | 3/2006 |
| JP | 2007-031888 | 2/2007 |

OTHER PUBLICATIONS

Ozawa Chizuo, Method for Printing Clothing Using Ink-Jet Printer and Clothing Printing System, Aug. 2, 2007, Machine Translated Japanese Patent Application Publication, JP2007-031888 (listed on IDS), All Pages.*

*Primary Examiner* — Ngon Nguyen
(74) *Attorney, Agent, or Firm* — Workman Nydegger (57) ABSTRACT

A printing device includes: a set unit on which a print medium can be set; a projection unit (projector) capable of projecting a first image onto the print medium set on the set unit; a printing unit capable of printing a second image on the print medium set on the set unit; and a control unit configured to modify a printing specification of the second image to be formed on the print medium based on modification information regarding a modification made to a projection specification of the first image projected onto the print medium by the projection unit.

12 Claims, 9 Drawing Sheets

(56) References Cited

U.S. PATENT DOCUMENTS

| | | | |
|---|---|---|---|
| 2014/0029030 A1* | 1/2014 | Miller | G06K 15/027 358/1.12 |
| 2015/0015796 A1* | 1/2015 | Stahl | H04N 9/3179 348/745 |

* cited by examiner

DOT GENERATION RATIO TABLE

|  | DOT GENERATION RATIO (THE NUMBER OF GENERATED DOTS) | | |
|---|---|---|---|
| INPUT TONE VALUE | SMALL DOT | MEDIUM DOT | LARGE DOT |
| 0 | s(0) | m(0) | l(0) |
| ⋮ | ⋮ | ⋮ | ⋮ |
| 158 | s(158) | m(158) | l(158) |
| 159 | s(159) | m(159) | l(159) |
| 160 | s(160) | m(160) | l(160) |
| 161 | s(161) | m(161) | l(161) |
| ⋮ | ⋮ | ⋮ | ⋮ |
| 255 | s(255) | m(255) | l(255) |

PRINTING DEVICE AND PRINTING METHOD

BACKGROUND

1. Technical Field

The present invention relates to printing devices and printing methods.

2. Related Art

Printing devices (ink jet printers) for printing color images by ejecting ink onto print media (for example, woven fabrics such as cloths and/or three-dimensional objects such as machine components) other than standard paper have been known. As an example of such printing devices, for example, JP-A-2006-69104 describes a printing device (printer system) including a projector capable of projecting an image onto a three-dimensional print medium and a printer configured to print an image identical to the projected image on the print medium. This printing device is configured such that the projector projects an image onto a print medium and the printer prints an image identical to the projected image on the print medium. Therefore, in the case of performing printing on an irregular-shaped object, a user can check a printing state by using the projector in advance, and the printing is then performed.

For the printing device described in JP-A-2006-69104, an adjustment method for aligning a print area of the printer and a projection area of the projector with each other in order to print an image having the same size as an image projected by the projector is described, but it is not considered that a user may modify (adjust) print settings (for example, the size, position, angle, and the like of an image to be printed) while viewing the projected image. Therefore, actual printing of an image to obtain a printed image and to check the printed image and further adjustment of the settings have to be repeated in order to obtain a desired print result.

SUMMARY

An advantage of some aspects of the invention can be implemented as the following forms or application examples.

First Application Example

A printing device according to a first application example includes: a set unit on which a print medium can be set; a projection unit capable of projecting a first image onto the print medium set on the set unit; a printing unit capable of printing a second image on the print medium set on the set unit; and a control unit configured to modify a printing specification of the second image to be formed on the print medium based on modification information regarding a modification made to a projection specification of the first image projected onto the print medium by the projection unit.

According to the present application example, a user modifies the projection specification of the first image while checking the first image projected onto the print medium and, by doing so, it is possible to modify the printing specification of the second image. Therefore, an adjustment for approximating the second image to be printed on the print medium to a desired image can be more easily performed.

Second Application Example

In the printing device according to the above application example, the control unit modifies a position of the second image to be formed on the print medium based on modification information regarding a modification made to a position of the first image projected onto the print medium by the projection unit.

According to the present application example, an adjustment for forming the second image at a desired position on the print medium can be more easily performed.

Third Application Example

In the printing device according to the above application example, the control unit modifies a size of the second image to be formed on the print medium based on modification information regarding a modification made to a size of the first image projected onto the print medium by the projection unit.

According to the present application example, an adjustment for forming the second image in a desired size on the print medium can be more easily performed.

Fourth Application Example

In the printing device according to the above application example, the control unit modifies an inclination of the second image to be formed on the print medium based on modification information regarding a modification made to an inclination of the first image projected onto the print medium by the projection unit.

According to the present application example, an adjustment for forming the second image at a desired inclination on the print medium can be more easily performed.

Fifth Application Example

In the printing device according to the above application example, the control unit modifies a color of the second image to be formed on the print medium based on modification information regarding a modification made to a color of the first image projected onto the print medium by the projection unit.

According to the present application example, an adjustment for forming the second image in a desired color on the print medium can be more easily performed.

Sixth Application Example

In the printing device according to the above application example, a range in which the projection specification is modified or a range in which the printing specification is modified is limited depending on a size of the set unit.

According to the present application example, the range in which the projection specification is modified or the range in which the printing specification is modified is limited depending on the size of the set unit, so that it is possible to more preferably perform printing.

Seventh Application Example

In the printing device according to the above application example, a focal length for projecting the first image onto the print medium by the projection unit is modified based on modification information regarding a modification made to a size of a gap between the set unit and the printing unit when the second image is to be printed on the print medium set on the set unit.

According to the present application example, even when the size of the gap between the set unit and the printing unit is modified, it is possible to more preferably project the first image onto the print medium set on the set unit.

Eighth Application Example

In the printing device according to the above application example, the first image is identical to the second image.

According to the present application example, a user can adjust the printing specification while viewing the first image projected onto the print medium as the second image to be printed on the print medium, so that the printing specification can be more easily adjusted.

Ninth Application Example

In the printing device according to the above application example, the first image is a guide image for guiding a position when the print medium is set on the set unit.

According to the present application example, a user can adjust the position of the print medium set on the set unit and/or can adjust the printing specification while viewing the guide image for guiding a position when the print medium is set on the set unit, so that it is possible to more easily adjust printing.

Tenth Application Example

In the printing device according to the above application example, the first image is a guide image for guiding an area in which the second image is to be printed on the print medium.

According to the present application example, a user can adjust the position of the print medium set on the set unit and/or can adjust the printing specification while viewing the guide image for guiding the area in which the second image is to be printed on the print medium, so that it is possible to more easily adjust printing.

Eleventh Application Example

A printing method according to the present application example includes: projecting a first image onto a print medium set on a set unit; making a modification to a projection specification of the first image projected onto the print medium; and making a modification to a printing specification of a second image to be formed on the print medium based on modification information regarding the modification made to the projection specification.

According to the present application example, a user modifies the projection specification of the first image while checking the first image projected onto the print medium and, by doing so, it is possible to modify the printing specification of the second image. Therefore, an adjustment for approximating the second image to be printed on the print medium to a desired image can be more easily performed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Exemplary embodiments of the invention will hereinafter be described with reference to the drawings. The following embodiments are exemplary and do not limit the invention. For ease of description, there may be a case where each of the drawings is illustrated at a scale different from the actual scale. In the coordinates illustrated in the figures, the Z-axis direction is the up-down direction, the positive Z direction is the upward direction, the Y-axis direction is the front-rear direction, the positive Y direction is the front direction, the X-axis direction is the right-left direction, the positive X direction is the left direction, and the X-Y plane is the horizontal plane.

First Embodiment

Printing Device

Figure 1:
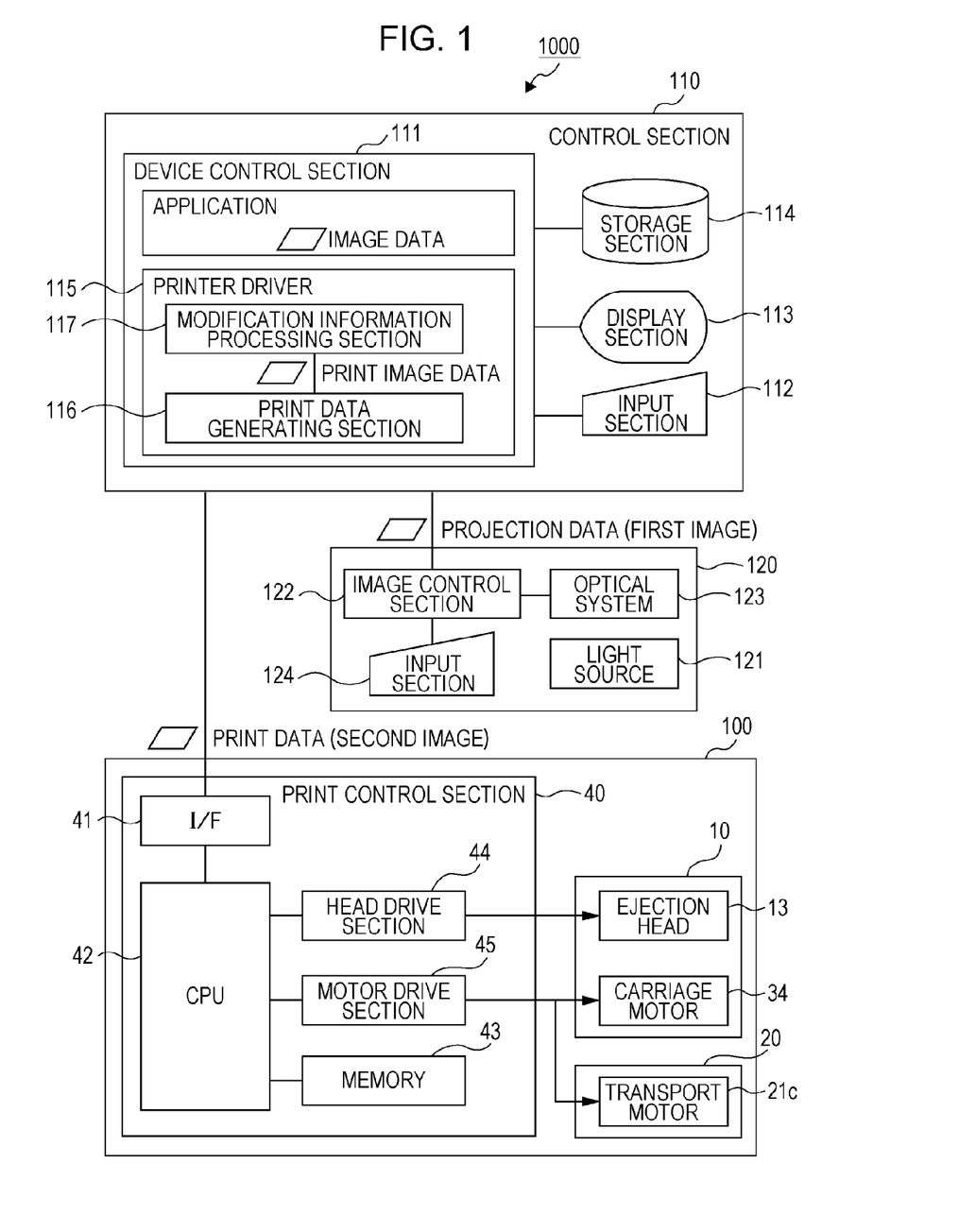
FIG. 1 is a block diagram illustrating the entire configuration of a printing device according to a first embodiment.

FIG. 1 is a block diagram illustrating the entire configuration of a printing device 1000 according to a first embodiment. The printing device 1000 is an ink jet-type textile printing device for performing (textile) printing of a desired image by ejecting ink onto a print medium. The printing device 1000 includes a printer 100 having a "printing unit" and a "set unit," a personal computer 110 (hereinafter referred to as PC 110) serving as a "control unit," a projector 120 serving as a "projection unit," and other components. Here, the printing device 1000 may be configured by connecting a plurality of independent devices (the printer 100, the PC 110, the projector 120, and other components) or may be configured as a device into which a plurality of elements (the printing unit, the set unit, the control unit, the projection unit, and other units) are integrated.

Printer 100

Figure 2A:
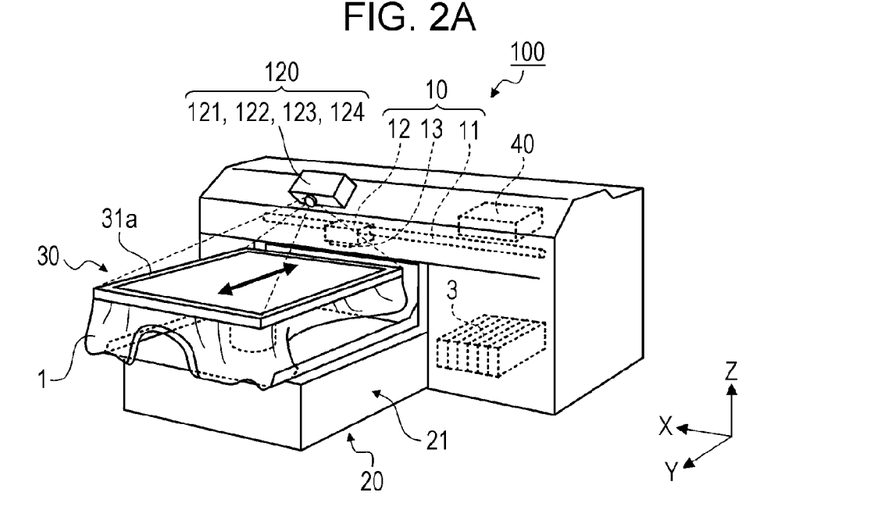
FIG. 2A is a perspective view illustrating the configuration of a printer.
Figure 2B:
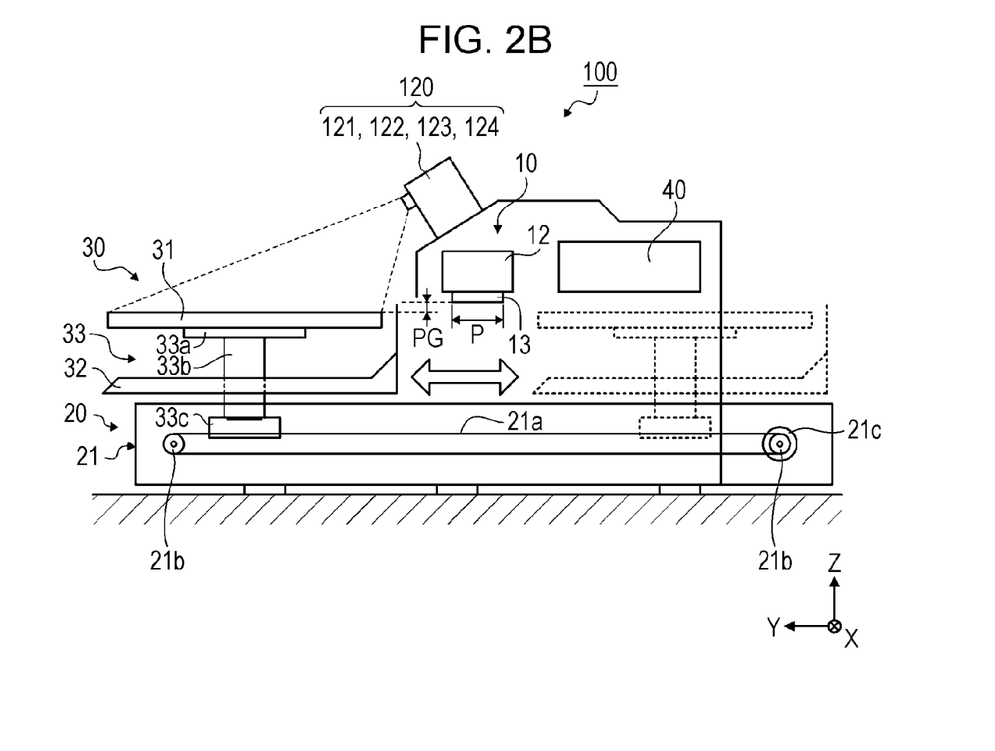
FIG. 2B is a side view illustrating the internal configuration of the printer.

FIG. 2A is a perspective view illustrating the configuration of the printer 100, and FIG. 2B is a side view illustrating the internal configuration of the printer 100. The printer 100 performs printing on a print medium 1 (for example, a woven fabric such as a T-shirt) based on control of the PC 110. The print medium 1 is not limited to a woven fabric. As the print medium 1, various media such as paper, film, and substrates can be used. The printer 100 includes a printing unit 10 serving as the "printing unit" configured to perform printing by ejecting print ink onto the print medium 1, a set unit 30 serving as the "set unit" on which the print medium 1 can be set (mounted and held), a transport unit 20 configured to transport the print medium 1 (i.e., the set unit 30), a print control unit 40 configured to control the whole operation of the printer 100, and other components.

The printing unit 10 includes a guide shaft 11 extending in a scan direction (in the X-axis direction in the figure) intersecting with a transport direction (the front-rear direction of the printer 100 (Y-axis direction in the figure)) of the print medium 1 (the set unit 30), a carriage 12 slidably supported on the guide shaft 11, an ejection head 13 held by the carriage 12, a carriage motor 34 (see FIG. 1) serving as a driving source when the carriage 12 is reciprocated along the longitudinal direction of the guide shaft 11, and other components. The carriage 12 carries the ejection head 13 and reciprocates the ejection head 13 in the scan direction (X-axis direction) by the driving of the carriage motor 34 based on control of the print control unit 40.

The ejection head 13 ejects cyan ink (C), magenta ink (M), yellow ink (Y), and black ink (K) which are examples of ink for forming an image, and white ink (W) for forming a base on the print medium 1 in an ejection area P (see FIG. 2B) based on the control of the print control unit 40. The white ink (W) for forming a base is used in an area where an image in which desired colors are developed without being influenced by the color of a printing surface of the print medium 1 (the color of the medium) is to be formed in order to form a base of the image. Here, the white ink (W) is used as ink for forming an image also when a white image is formed. Each ink is fed to the ejection head 13 from an ink cartridge 3 via a tube, or the like. Note that examples of the image include characters, figures, symbols, etc.

The set unit 30 includes a set tray 31, a table 32, a supporting member 33, and other components. The set unit 30 supports the print medium 1 with the set tray 31 and is moved to the ejection area P of the printing unit 10 by a transport mechanism 21 (which will be described later) included in the transport unit 20 based on the control of the print control unit 40. The printer 100 alternately repeats the reciprocating movement of the ejection head 13 in the scan direction (X-axis direction) while ejecting ink and the movement of the set unit 30 in a direction (the negative Y direction) intersecting with the scan direction (X-axis direction) based on the control of the print control unit 40, thereby forming a desired image on a surface of the print medium 1.

The set tray 31 is a flat plate having an upper surface for supporting the print medium 1 and keeps the print medium 1 in a planar state by using a frame 31a. Flat plates in a plurality of sizes and/or shapes and frames each corresponding to one of the flat plates are prepared in sets so that it is possible to select a set tray 31 and a frame 31a each having a size and/or shape appropriate for the size and/or shape of the print medium 1 to be set.

The table 32 is a flat plate table disposed under the set tray 31 and is slightly larger than the maximum size of the set tray 31. A part of the print medium 1 at an outer circumference of a printing surface surrounded by the frame 31a is folded or rolled, and can be mounted on the table 32. The table 32 includes side plates on the right and left sides and the rear side to protect the print medium 1 in an inner space enclosed by the side plates.

The support member 33 includes a mounting table 33a, a support rod 33b, a connecting member 33c, and other components. The mounting table 33a is fixed to an upper part of the support rod 33b and can horizontally (parallel to a floor surface on which the printer 100 is installed) and fixedly support the set tray 31 in such a manner that the set tray 31 is replaceable. The support rod 33b is fixed to the connecting member 33c, supportively fixes the table 32 above the connecting member 33c, and supportively fixes the mounting table 33a above the table 32. The support rod 33b includes a height adjusting mechanism (not shown) for adjusting the height position of the printing surface (a surface of the print medium 1), that is, the mounting table 33a in accordance with, for example, the thickness of the print medium 1. The connecting member 33c connects the support rod 33b to the transport mechanism 21 included in the transport unit 20 and supports the support rod 33b so that the set tray 31 is kept horizontal over a movement route along which the set unit 30 moves.

The transport unit 20 includes the transport mechanism 21 and forms the movement route along which the set unit 30 moves. The transport mechanism 21 includes a transport belt 21a, pulleys 21b, a transport motor 21c, and other components. The transport motor 21c operates based on the control of the print control unit 40, so that the transport belt 21a turns, and the set unit 30 connected to the transport belt 21a moves in the Y-axis direction.

The movement route formed by the transport unit 20 is configured such that the set unit 30 can move in a moving direction (the Y-axis direction) from a position (hereinafter referred to as a set position) at which a user sets (or removes) the print medium 1 on the set unit 30 to an area in which an image can be formed on the set print medium 1, and further to a position (a maintenance position) at which a space required for maintenance of the printer 100 is needed and which is located on a side opposite to the set position. That is, the transport unit 20 extends so that the movement route has sufficient lengths from the body of the printer 100 in the front direction (positive Y direction) and in the rear direction (negative Y direction).

Note that since the upper surface of the set tray 31 serves as a platen, the movement route of the set unit 30 is configured such that the set unit 30 moves while a gap (a platen gap PG) between the upper surface of the set tray 31 and a lower surface of the ejection head 13 is kept at a predetermined size (length) in the ejection area P.

In a moving area of the set unit 30, the set position is a position at which the set unit 30 is sufficiently pulled out of the body (housing) of the printer 100 in the positive Y direction. Moreover, as described later, when the set unit 30 is located at the set position, the projector 120 can project an image onto an upper surface area of the set tray 31 (on an upper surface area of the print medium 1 when the print medium 1 is set).

The print control unit 40 controls a relative position of a projection position of the projector 120 and the position of the set tray 31 so that the projection position of an image by the projector 120 is located at a predetermined position within the allowable range of predetermined accuracy with respect to the set tray 31 located at the set position.

As illustrated in FIG. 1, the print control unit 40 includes an interface 41, a CPU 42, a memory 43, a head drive unit 44, a motor drive unit 45, and other components.

The interface 41 transmits and receives data between the PC 110 and the printer 100. The CPU 42 is a processing unit configured to control the whole printer 100. The memory 43 includes a storage element, such as a RAM, EEPROM, or the like forming an area for storing a program of the CPU 42. The head drive unit 44 drives the ejection head 13. The motor drive unit 45 drives the carriage motor 34 and the transport motor 21c. The CPU 42 controls the ejection head 13 via the head drive unit 44 and controls the carriage motor 34 and the transport motor 21c via the motor drive unit 45 according to the program stored in the memory 43.

Control Unit (PC 110)

The PC 110 generates print data used for causing the printer 100 to perform printing based on general image data captured by a digital camera, or the like and transmits the print data to the printer 100 connected to the PC 110. As illustrated in FIG. 1, the PC 110 includes a device control unit 111, an input unit 112, a display unit 113, a storage unit 114, and other components.

The device control unit 111 includes a CPU (an arithmetic unit), a RAM, a ROM, and other components (which are not shown) and performs central control of the whole printing device 1000. The input unit 112 is an information input unit serving as a human interface. Specifically, the input unit 112 is a port, or the like to which, for example, a keyboard or an information input apparatus is connected. The display unit 113 is an information display unit (display) serving as a human interface. Based on control of the device control unit 111, the display unit 113 can display information input via the input unit 112, an image to be printed by the printer 100, and the like. The storage unit 114 is a rewritable memory medium such as a hard disk drive (HDD) or a memory card and stores software operated by the PC 110 (a program running on the device control unit 111), image data to be printed, etc.

The software operated on the PC 110 includes general image processing application software (hereinafter referred to as an application) and printer driver software (hereinafter referred to as a printer driver 115). The printer driver 115 includes a print data generating unit 116 as a functional unit which generates print data used for causing the printer 100 to perform printing.

The device control unit 111 includes a modification information processing unit 117 as a functional unit specific to the present embodiment in the printer driver 115. The modification information processing unit 117 has a function of modifying printing specifications of an image to be formed on the print medium 1 based on modification information regarding a modification made to projection specifications of an image displayed on the print medium 1 by the projector 120. Details of the function of the modification information processing unit 117 will be described later.

Basic Flow for Generating Print Data

The PC 110 (specifically, the print data generating unit 116 included in the printer driver 115) converts general RGB formatted image data captured by a digital camera, or the like to CMYKW formatted print data which can drive the printer 100.

The RGB formatted image data has a tone value R(r) corresponding to the strength of a red component, a tone value G(g) corresponding to the strength of a green component, and a tone value B(b) corresponding to the strength of a blue component for each of pixels forming an image, and expresses colors in RGB (r, g, b). Note that the tone value is a coordinate value in each of color spaces.

The CMYKW formatted print data has a tone value C(c) corresponding to the used amount (ejection amount) of cyan ink (C), a tone value M(m) corresponding to the used amount (discharge amount) of magenta ink (M), a tone value Y(y) corresponding to the used amount (discharge amount) of yellow ink (Y), a tone value K(k) corresponding to the used amount (discharge amount) of black ink (K), and a tone value W(w) corresponding to the used amount (discharge amount) of white ink (W) for each of pixels forming an image. The CMYKW formatted print data expresses colors in CMYKW (c, m, y, k, w).

In the following description, in order to facilitate understanding, the RGB formatted image data and the CMYKW formatted image data are each data of 256 tones. In the CMYKW formatted print data, in the case of the tone values C(0), M(0), Y(0), K(0), and W(0), ink corresponding to each color is not ejected when printing the pixel, whereas in the case of the tone values C(255), M(255), Y(255), K(255), and W(255), a maximum amount of ink corresponding to each color is ejected when printing the pixel.

Figure 3:
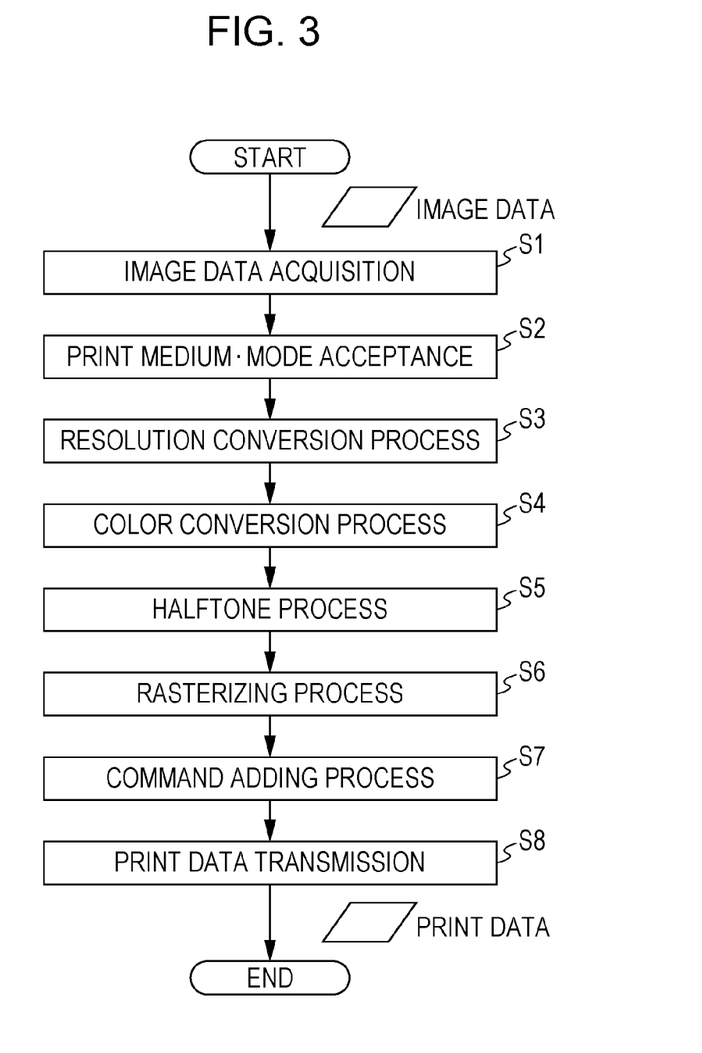
FIG. 3 is a flow chart illustrating a basic flow for generating print data.

FIG. 3 is a flow chart illustrating a basic flow for generating print data. The printer driver 115 receives image data from an application (step S1) and accepts a specification of the print medium 1 on which printing will be performed and/or a setting of a print mode from a user (step S2). The printer driver 115 converts the image data to print data in a format which the printer 110 can interpret (step S3-step S7) and outputs (transmits) the print data to the printer 100 (step S8). When the image data from the application is converted to the print data, the printer driver 115 performs a resolution conversion process, a color conversion process, a halftone process, a rasterizing process, a command adding process, and other processes.

The resolution conversion process (step S3) is a process in which the image data output from the application is converted so as to have a resolution for printing (print resolution) with which printing is performed on the print medium 1. For example, when a print resolution of 720×720 dpi is specified, vector formatted image data received from an application is converted to bitmap formatted image data having a resolution of 720×720 dpi. Each piece of pixel data of the image data after the resolution conversion process includes a corresponding one of pixels arranged in a matrix. Each pixel has, for example, a tone value in 256 tones in the RGB color space. That is, each piece of the pixel data after the resolution conversion process shows the tone value of the corresponding pixel.

The color conversion process (step S4), which is subsequently performed, is a process in which RGB formatted image data is converted to CMYKW formatted data (data in the CMYKW color system space). The CMYKW formatted image data is data corresponding to colors of ink which the printer 100 has. Therefore, when the printer 100 uses five types of ink of the CMYKW color system, the printer driver 115 generates CMYKW formatted image data in the five-dimensional space based on the RGB formatted image data. This color conversion process is performed based on a table (color conversion look-up table LUT) in which the tone values of the RGB formatted image data and the tone values of the CMYKW formatted image data are associated with each other. Note that the image data after the color conversion process is the CMYKW formatted image data of 256 tones expressed in the CMYKW color system space. Here, the types of used ink are not limited to five types even in the CMYKW color system. For example, 10 types of ink may be used for printing. In this case, the color conversion process generates CMYKW formatted image data in the 10-dimensional space.

The halftone process (step S5), which is subsequently performed, is a process in which data of a large number of tones (256 tones) is converted to data of a number of tones that can be formed by the printer 100. Data expressing 256 tones is converted into 1-bit data expressing two tones, 2-bit data expressing four tones, and so on through this halftone process. The image data after the halftone process is 1-bit or 2-bit pixel data, and this pixel data is data expressing dot formation for a corresponding pixel (the presence/absence of a dot and the size of the dot).

For example, in the case of two bits (four tones), the conversion results in four tones, namely no dot, corresponding to a dot tone value of "00"; small dot, corresponding to a dot tone value of "01"; medium dot, corresponding to a dot tone value of "10"; and large dot, corresponding to a dot tone value of "11." After setting a dot generation ratio for the size of each dot, pixel data is created using dithering, γ correction, an error diffusion method, and so on so that the printer 100 forms the dots in a dispersed manner.

Figure 4A:
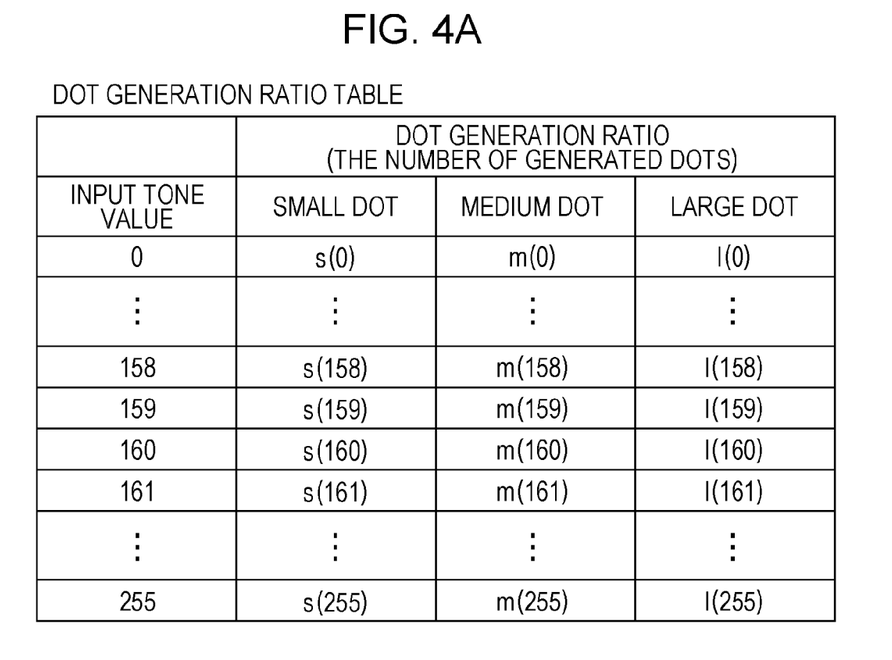
FIG. 4A is a table illustrating a dot generation ratio.
Figure 4B:
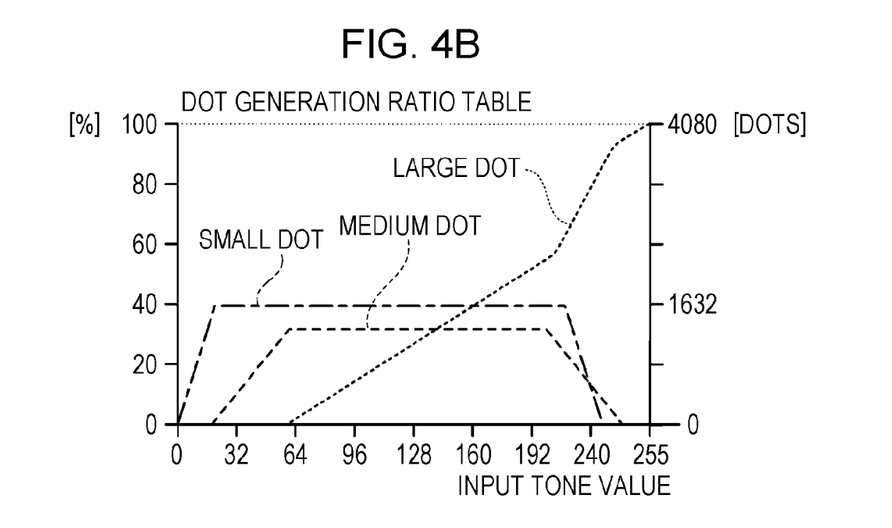
FIG. 4B is a graph illustrating the dot generation ratio.

FIG. 4A is a table illustrating a dot generation ratio in the case of two bits (four tones), and FIG. 4B is a view in which the dot generation ratio table is shown in a graph. The dot generation ratio table is a table in which the tone value of each pixel included in the image data (hereinafter referred to as the input tone value) is associated with the dot generation ratio (or the number of generated dots) of each dot size of dots formed on the print medium 1 by the printer 100. The dot generation ratio table is stored in the memory 43 in the printer 100 for each color of ink. The total sum of products of the ejection amount per dot of each dot size and the number of generated dots is the ink discharge amount.

In the graph illustrated in FIG. 4B, the horizontal axis shows the input tone values (0-255) expressed by the pixel data, the vertical axis on the left shows the dot generation ratio (0-100%), and the vertical axis on the right shows the number of generated dots (0-4080 dots). The dot generation ratio with an input tone value i means the percentage (for example, (n/4080)×100) of pixels in which dots are formed (for example, n dots) in pixels belonging to a unit area on the print medium 1 (for example, 4080 dots), where all pieces of pixel data corresponding to the unit area show the input tone value i. Similarly, the number of generated dots with an input tone value i means the number of dots formed in a unit area on the print medium 1, where all pieces of pixel data corresponding to the unit area show the input tone value i.

The rasterizing process (step S6), which is subsequently performed, is a process in which pieces of the pixel data arranged in a matrix are reordered in accordance with a dot formation order during printing. For example, when a dot forming process is performed by being divided into a number of dot forming actions during printing, pieces of pixel data each corresponding to one of the dot forming actions are extracted and reordered in accordance with the order of the dot forming actions. Here, the rasterizing process is performed according to the printing method since the dot formation order during printing is different if the printing method is different.

The command adding process (step S7), which is subsequently performed, is a process in which command data corresponding to the printing method is added to the data after the rasterizing process. An example of the command data is transport data indicating the transport speed of the print medium 1. The print data is transmitted to the printer 100 connected to the PC 110, so that the printer 100 starts printing (step S8).

Projection Unit (Projector 120)

The projector 120 has a function of projecting an image onto the set unit 30 (specifically, the upper surface area of the set tray 31 (the upper surface area of the print medium 1 when the print medium 1 is set)) located at the above-described set position. The image projected by the projector 120 is a "first image" used by a user to adjust (modify) the printing specifications of an image (a "second image") to be printed on the print medium 1 by the printer 100. As illustrated in FIG. 1, the projector 120 includes a light source 121, an image control unit 122, an optical system 123, an input unit 124 configured to operate the image control unit 122, and other components.

The light source 121 is, for example, a halogen lamp. The optical system 123 includes an RGB liquid crystal light valve, an optical lens, and other components driven and controlled by the image control unit 122.

The image control unit 122 is a control unit configured to control the optical system 123 to project projection data (the first image) received from the PC 110. The image control unit 122 can set (adjust) projection specifications (specifications relating to the projection area such as projection magnification, projection position, projection angle, and keystone correction) of a projected image on the set unit 30. The image control unit 122 can transmit/receive information on the setting (adjustment) to/from the PC 110. That is, when the projection specifications for projecting the first image onto the set unit 30 are set (adjusted) in the projector 120, information on results of the setting (adjustment) is transmitted to the PC 110, whereas when the projector 120 receives information on a setting (an adjustment) of the projection specifications from the PC 110, the projector 120 sets (adjusts) the projection specifications for projecting the first image onto the set unit 30 according to the information.

Modification Information Processing Unit 117

As a function specific to the present embodiment, the modification information processing unit 117 as a functional unit of the printer driver 115 operated in the control unit (PC 110) has a function of modifying the printing specifications of the second image to be formed on the print medium 1 based on modification information regarding a modification made to the projection specifications of the first image displayed on the print medium 1 by the projection unit (the projector 120). Specific description will be given below.

Figure 5A:
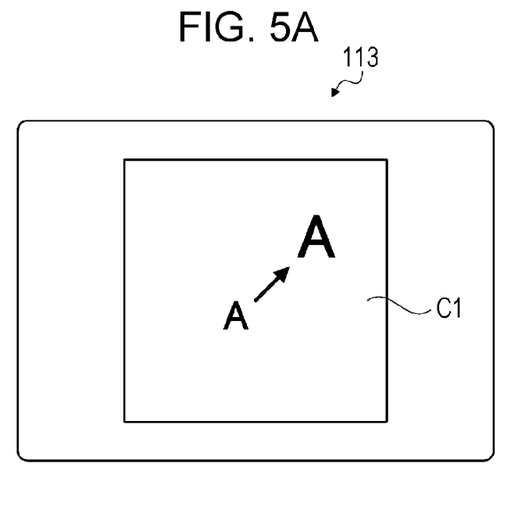
FIG. 5A is a conceptual view illustrating the relationship between a first image and a second image.
Figure 5B:
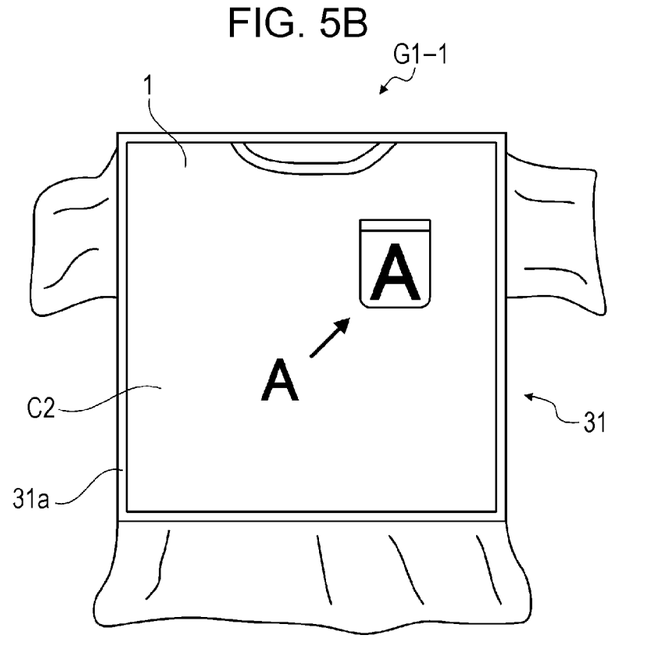
FIG. 5B is a conceptual view illustrating the relationship between the first image and the second image.

FIGS. 5A and 5B are conceptual views illustrating the relationship between a first image and a second image. In the present embodiment, the first image projected onto the set unit 30 by the projector 120 is identical to the second image to be printed on the print medium 1 by the printer 100. An example will be described in which a character "A" is printed with a desired design on a pocket part of a T-shirt as the print medium 1. The character "A" to be printed is designed to have a desired color and/or shape in the form of image data. As illustrated in FIG. 5A, image data "A" is displayed on the display unit 113 of the PC 110. The position, size, inclination, color, and the like of the image data "A" can be modified by an operation of the input unit 112. At the same time, the projector 120 projects image data "A" corresponding to the image displayed on the display unit 113 onto the print medium 1 (T-shirt) set at the set position as the first image as illustrated in FIG. 5B. A user can make modifications (adjustments) by operation of the input unit 112 of the PC 110 so that the projection position of the character "A" is superimposed on the desired pocket part, and the character "A" has a desired inclination, size, color, and the like while viewing the image (the first image) projected by the projector 120. After these modifications (adjustments) have been completed, the printer 100 prints the image (the second image) reflecting results of the adjustments.

As a function to realize a series of these actions, the modification information processing unit 117 has an area alignment function, an image specification modifying function, a print image data generating function, and other functions.

Area Alignment Function

The area alignment function is a function of associating coordinate information of image data processed in the PC 110 with the projection position by the projector 120 and the print position by the printer 100. As illustrated in FIG. 5A, in the process of the image data in the PC 110, a canvas area C1 as a virtual area corresponding to an area in which printing is possible in the print medium 1 is provided. Within the canvas area C1, a first image to be printed (for example, the image data "A") is arranged at a desired position and/or in a desired size. The projector 120 projects the image of the canvas area C1 in which the first image is arranged. The canvas area C1 has to be calibrated for an area in which printing is actually possible in the print medium 1 (print area C2). At the set position, the print area C2 has to be matched with an area onto which the projector 120 projects an image.

Figure 6A:
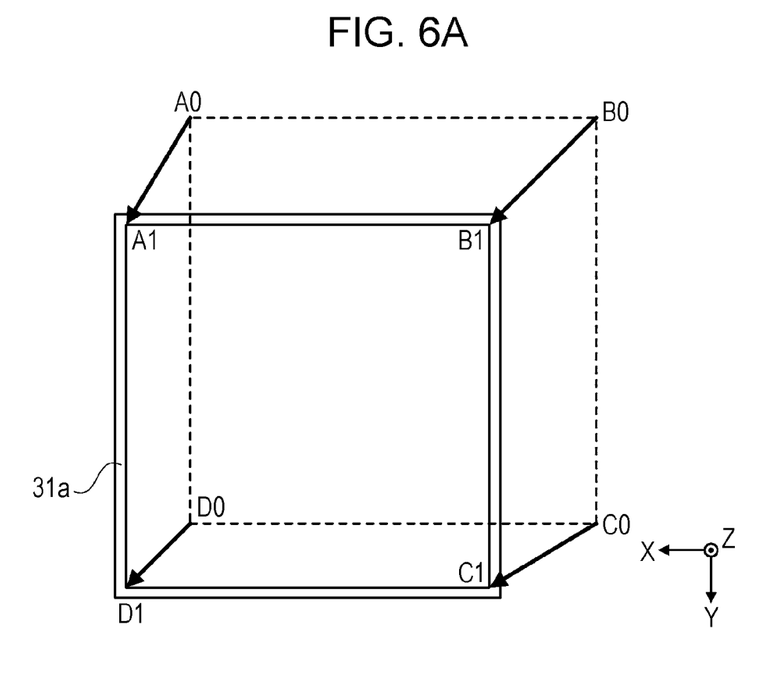
FIG. 6A is a conceptual view illustrating an area alignment function.
Figure 6B:
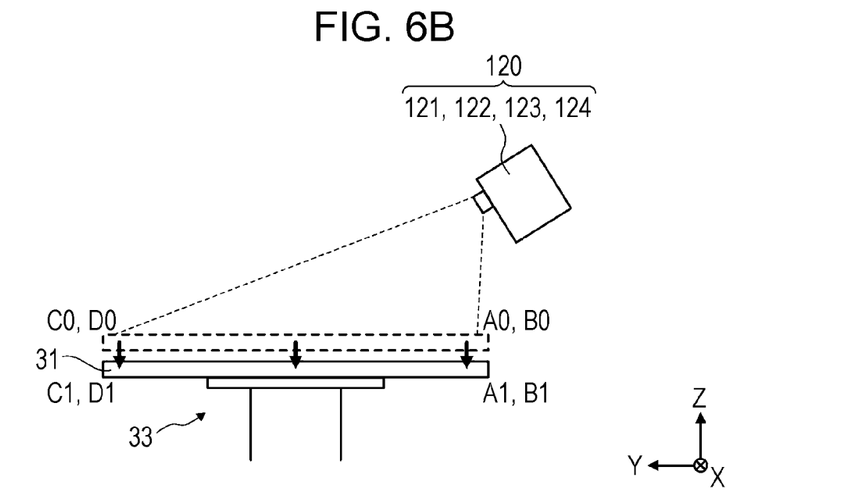
FIG. 6B is a conceptual view illustrating the area alignment function.

FIGS. 6A and 6B show how the canvas area C1 and the print area C2 are calibrated for each other using the area alignment function. First, the projector 120 projects a rectangular graphic A0B0C0D0 indicating the canvas area C1 onto the set unit 30 (the upper area of the set tray 31) located at the set position. Next, as illustrated in FIG. 6A, the image control unit 122 of the projector 120 aligns the projection position of the rectangular graphic A0B0C0D0 with an area (rectangle A1B1C1D1) inside the frame 31a of the set tray 31. Adjustment information at this time is transmitted from the projector 120 to the PC 110 and stored in the memory 114 as an initial value of position alignment data calibrating the canvas area C1 for the print area C2. The position alignment data varies depending on the size of the set tray 31. Therefore, if set trays 31 in a plurality of sizes and/or shapes are prepared, pieces of position alignment data are stored as pieces of attribute information each for a corresponding one of the set trays 31. That is, from the stored pieces of position alignment data, data corresponding to a used set tray 31 is selected, so that a corresponding canvas area C1 is selected. As a result, the print area is automatically limited.

For example, as illustrated in FIG. 6B, even when an identical set tray 31 is used, the projection specifications (projection magnification, focus position, projection angle, keystone correction, etc.) change if the gap (the platen gap PG (see FIG. 2B)) between the upper surface of the set tray 31 and the lower surface of the ejection head 13 is modified. Therefore, the areas have to be aligned with each other based on different position alignment data. Therefore, in the present embodiment, the relationship between the size of the platen gap PG and its corresponding position alignment data is obtained in advance so that the above-described alignment of the areas with each other is not necessary whenever the platen gap PG is modified. That is, correction in accordance with the size of the modified platen gap PG with respect to the initial value is performed.

In this way, the area alignment function calibrates the canvas area C1 for the area (print area C2) onto which an image is projected by the projector 120. Thus, when the printer 100 receives print data generated based on the canvas area C1, the printer 100 can perform printing in the print area C2 of the print medium 1 in the ejection area P (see FIG. 2B).

Image Specification Modifying Function

The image specification modifying function is a function of accepting modifications (adjustments) which a user makes to image data in the canvas area C1 while viewing the first image displayed on the display unit 113 and projected onto the print area C2 of the print medium 1 at the set position. The modifications (adjustments) to the image data include modifications (adjustments) of the size, position, inclination, color, and the like of the first image.

Print Image Data Generating Function

The print image data generating function is a function of generating print image data representing image information for which the modifications (adjustments) have been completed. The print image data to be generated is image data forming the first image arranged in the canvas area C1 (that is, the first image whose background is the canvas area C1).

The modification information processing unit 117 transfers the generated print image data to the print data generating unit 116. The print data generating unit 116 acquires the print image data as the image data acquired at step S1 according to the flow for generating the print data illustrated in FIG. 3 and generates, based on the print image data, print data which causes the printer 100 to perform printing.

As described above, the printer driver 115 including the modification information processing unit 117 calibrates the canvas area C1 for the print area C2. A user modifies image data (the first image) by an operation of the input unit 112 while viewing the first image displayed on the display area 113 and projected onto the print area C2 of the print medium 1 at the set position. The modified image is printed as the second image in the ejection area P in the print area C2 of the print medium 1.

Printing Method

A printing method using the printing device of the present embodiment will be described in accordance with printing procedures. The printing method of the present embodiment includes: a "projection step" of projecting a first image onto a print medium 1 set on a set unit 30; a "projection specification modifying step" of making a modification to projection specifications of the first image projected onto the print medium 1; and a "print specification modifying step" of making a modification to printing specifications of a second image to be formed on the print medium 1 based on modification information regarding the modification made to the projection specifications. Specific description will be given below with reference to the flow chart.

Figure 7:
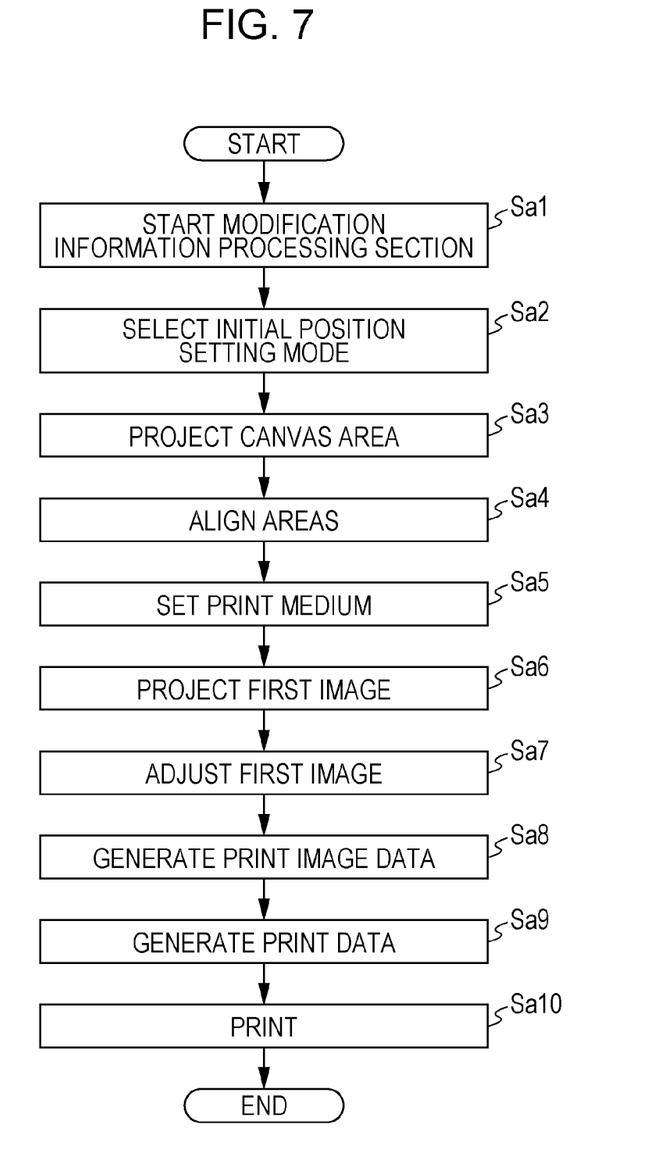
FIG. 7 is a flow chart illustrating a printing method using the printing device according to the first embodiment.

FIG. 7 is a flow chart illustrating a printing method using the printing device of the present embodiment. First, the printing device 1000 is started, and the printer driver 115, the print data generating unit 116, and the modification information processing unit 117 are activated by operating the PC 110 (step Sa1). Next, an initial position setting mode of functions of the modification information processing unit 117 is selected (step Sa2), which moves the set unit 30 to the set position in accordance with control by the PC 110 (control based on an instruction from the modification information processing unit 117), and the projector 120 projects a rectangular graphic A0B0C0D0 indicating the canvas area C1 onto the upper surface area of the set tray 31 (step Sa3).

Then, alignment of the projection position of the rectangular graphic A0B0C0D0 with an area (rectangle A1B1C1D1) within the frame 31a of the set tray 31 as illustrated in FIG. 6A is performed by operating the image control unit 122 of the projector 120 (step Sa4). When the alignment has been completed, the projector 120 transmits alignment information (adjustment information) to the PC 110. The PC 110 (modification information processing unit 117) stores the alignment information (adjustment information) as an initial value of position alignment data calibrating the canvas area C1 for the print area C2 in the storage unit 114.

Next, the print medium 1 is set on the set unit 30 (step Sa5), an image to be printed on the print medium 1 is selected by the PC 110, and the selected image is projected as a first image onto the upper surface of the print medium 1 by the projector 120 (the projection step: step Sa6). Then, an adjustment in the first image is performed (the projection specification modifying step: step Sa1) so that desired printing is performed. A user makes the adjustment in the first image by an operation of the input unit 112 while viewing the first image displayed on the display unit 113 and projected onto the print medium 1 at the set position so that the first image has a desired size, angle, color, and the like at a desired position.

When the adjustment in the first image has been completed, the modification information processing unit 117 first generates, as the print specification modifying step, print image data representing image information of the first image for which the adjustment has been completed (step Sa8), and transmits the print image data to the print data generating unit 116. Next, the print data generating unit 116 generates, based on the received print image data, print data which causes the printer 100 to perform printing (step Sa9).

The PC 110 (the printer driver 115) transmits the print data to the printer 100. The printer 100 receives the print data and then executes printing (step Sa10).

As described above, according to the printing device of the present embodiment, the following effects can be obtained. A user modifies the projection specifications of the first image while checking the first image projected onto the print medium 1 set on the set unit 30 at the set position and, by doing so, it is possible to modify the printing specifications of the second image to be printed. Therefore, an adjustment for approximating the second image to be printed on the print medium 1 to a desired image can be more easily performed. The projection specifications of the first image are the position, size, inclination, color, and the like of the first image. Modifying these specifications allows the printing specifications (the position, size, inclination, color, and the like of the second image) of the second image to be modified. Therefore, the adjustment can be more easily performed.

Since the area in which the projection specifications are modified or the area in which the printing specifications are modified is limited depending on the size of the set unit 30 (i.e., the size of the set tray 31), print setting can be more suitably performed.

Even when the size of the gap between the set unit 30 and the printing unit 10 is modified, the first image can be more preferably projected onto the print medium 1 set on the set unit.

Moreover, a user can adjust the printing specifications while viewing the first image projected onto the print medium 1 as the second image to be printed on the print medium 1, so that the printing specifications can be more easily adjusted.

Moreover, according to the printing method of the present embodiment, a user modifies the projection specifications of the first image while checking the first image projected onto the print medium 1 and, by doing so, it is possible to modify the printing specifications of the second image. Therefore, an adjustment for approximating the second image to be printed on the print medium 1 to a desired image can be more easily performed.

Second Embodiment

A printing device according to a second embodiment will be described. In the description, the same components as those in the embodiments described above have the same reference characters, and no redundant description will be made. In the first embodiment, an example was described in which the first image projected onto the set unit 30 by the projector 120 is identical to the second image to be printed on the print medium 1 by the printer 100. However, in the second embodiment, the first image is a guide image for position alignment when the print medium 1 is set on the set tray 31. Except for this point, the configuration of the printing device of the second embodiment is the same as that of the first embodiment.

Figure 8:
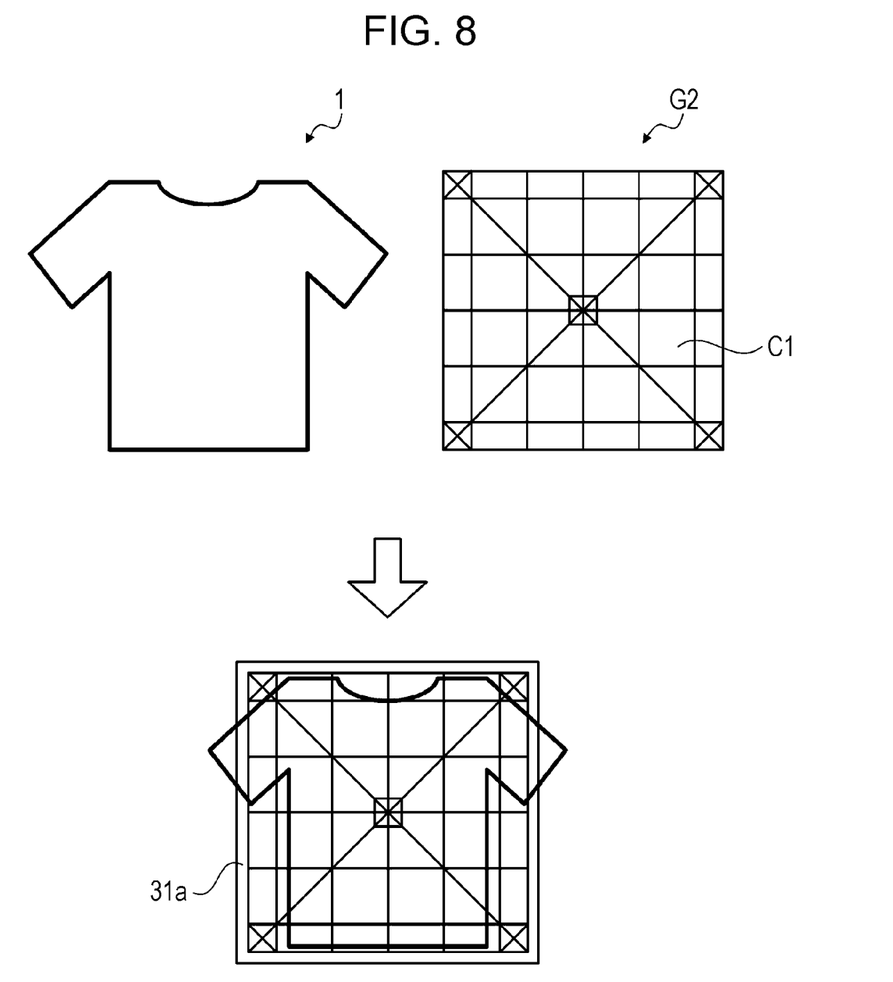
FIG. 8 is a conceptual view illustrating a first image according to a second embodiment.

FIG. 8 is a conceptual view illustrating an example in which the first image is the guide image for position alignment. A first image G2 which is the guide image for position alignment is, for example, as illustrated in FIG. 8, an image in which four corner parts and a center position of a canvas area C1 are simply indicated by crossing lines. In the area among the corner parts and the center position, equally spaced grid lines are depicted.

Before the print medium 1 (for example, a T-shirt) is set, the first image G2 is projected onto the set tray 31, so that the print medium 1 can be set at a suitable position. At this time, the first image G2 is larger than a print area C2. Therefore, position alignment of the print medium 1 can be performed more easily. In the case where guide lines or marks are depicted on the surface of the set tray 31, the guide lines or marks are hidden by the print medium 1 set on the set tray, which may make the position alignment difficult. However, since the first image G2 is projected onto the print medium 1, the first image G2 is not hidden even when the print medium 1 is set, so that it is possible to check the position while the print medium 1 is set.

After the print medium 1 has been set on the set tray 31, the position of the first image G2 to be projected is adjusted if a fine position adjustment has to be performed (for example, the center of the print medium 1 is precisely aligned with the center position of the canvas area C1). The position adjustment is performed by operating the image control unit 122 of the projector 120. When the PC 110 receives information on the position adjustment, a position at which printing is actually performed on the print medium 1 is set by reflecting the results of the adjustment with respect to an initial value at which the position alignment has been performed, which allows printing at a desired position.

Third Embodiment

A printing device according to a third embodiment will be described. In the description, the same components as those in the embodiments described above have the same reference characters, and no redundant description will be made. In the first embodiment, the first image projected onto the set unit 30 by the projector 120 is identical to the second image to be printed on the print medium 1 by the printer 100. However, in the third embodiment, the first image is a guide image for guiding an area in which a second image is to be printed on the print medium 1. Except for this point, the configuration of the printing device of the third embodiment is the same as that of the first embodiment.

Figure 9:
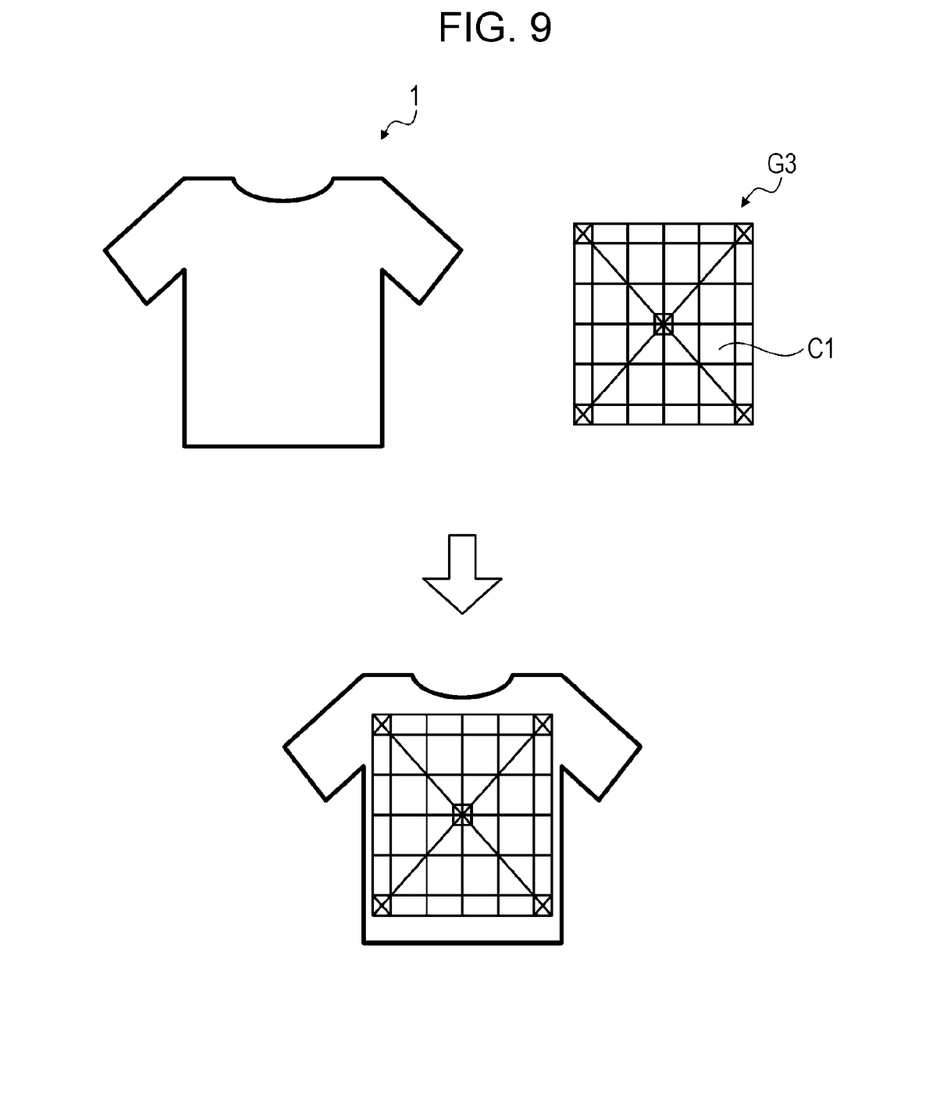
FIG. 9 is a conceptual view illustrating a first image according to a third embodiment.

FIG. 9 is a conceptual view illustrating an example of a guide image for guiding the area in which the second image is to be printed on the print medium 1. A first image G3, the guide image for guiding the area in which an image is to be printed, is, for example, as illustrated in FIG. 9, an image in which four corner parts and a center position of a canvas area C1 are simply indicated by crossing lines. In the area among the corner parts and the center position, equally spaced grid lines are depicted.

When the print medium 1 (for example, a T-shirt) is set on the set unit 30, the first image G3 is projected onto the set tray 31 or the set print medium 1, so that it is possible to easily set the area in which printing is performed on the print medium 1. At this time, the first print image G3 is smaller than the print medium 1. Therefore, the second image can be printed without extending beyond the print medium 1. In setting the print area after the print medium 1 (for example, a T-shirt) has been set on the set unit 30, adjustment of the position, size, inclination, and the like of the print area is possible, and the adjustment is made by operating the image control unit 122 of the projector 120. When the PC 110 receives information on the adjustment, a position at which printing is actually performed on the print medium 1 is set by reflecting the results of the adjustment with respect to an initial value at which the position alignment has been performed, which allows printing at a desired position. In this way, a user can adjust the position of the print medium 1 set on the set unit 30 and/or can adjust the printing specifications for the print medium 1 while viewing the guide image for guiding the area in which the second image is to be printed on the print medium 1, so that it is possible to more easily adjust printing.

The entire disclosure of Japanese Patent Application No. 2015-074865, filed Apr. 1, 2015 is expressly incorporated by reference herein.

What is claimed is:

1. An ink jet-type printing device comprising:
   a set unit on which a print medium can be set;
   a projection unit capable of projecting a first image onto the print medium set on the set unit, wherein projection of the first image onto the print medium by the projection unit does not cause permanent recording of the first image on the print medium;
   an ejection head capable of printing a second image on the print medium set on the set unit by ejecting ink; and
   a control unit configured to modify a printing specification of the second image to be formed on the print medium based on modification information regarding a modification made to a projection specification of the first image projected onto the print medium by the projection unit,
   wherein the projecting unit is disposed on an exterior surface of a housing of the printing device and projects onto the print medium when the set unit is outside of the housing and the printing unit is disposed inside the housing and prints the second image when the set unit is inside the housing.

2. The ink jet-type printing device according to claim 1, wherein
   the control unit modifies a position of the second image to be formed on the print medium based on modification information regarding a modification made to a position of the first image projected onto the print medium by the projection unit.

3. The ink jet-type printing device according to claim 1, wherein
   the control unit modifies a size of the second image to be formed on the print medium based on modification information regarding a modification made to a size of the first image projected onto the print medium by the projection unit.

4. The ink jet-type printing device according to claim 1, wherein
   the control unit modifies an inclination of the second image to be formed on the print medium based on modification information regarding a modification made to an inclination of the first image projected onto the print medium by the projection unit.

5. The ink jet-type printing device according to claim 1, wherein
   the control unit modifies a color of the second image to be formed on the print medium based on modification information regarding a modification made to a color of the first image projected onto the print medium by the projection unit.

6. The ink jet-type printing device according to claim 1, wherein
   a range in which the projection specification is modified or a range in which the printing specification is modified is limited depending on a size of the set unit.

7. The ink jet-type printing device according to claim 1, wherein
   a focal length for projecting the first image onto the print medium by the projection unit is modified based on modification information regarding a modification made to a size of a gap between the set unit and the ejection head when the second image is to be printed on the print medium set on the set unit.

8. The ink jet-type printing device according to claim 1, wherein the first image is identical to the second image.

9. The ink jet-type printing device according to claim 1, wherein the first image is a guide image that visually indicates a position where the second image will be printed when the print medium is set on the set unit.

10. The ink jet-type printing device according to claim 1, wherein the first image is a guide image for guiding an area in which the second image is to be printed on the print medium.

11. An ink jet-type printing device including a projection unit, an ejection head, a processor, and a non-transitory memory storing executable instructions, that when executed by the processor, cause the printing device to perform the following method, the method comprising:
    projecting by the projection unit a first image onto a print medium set on a set unit of the printing device, wherein projection of the first image onto the print medium does not cause permanent recording of the first image on the print medium, wherein the projection unit is disposed on an exterior surface of a housing of the printing device and projects onto the print medium when the set unit is outside of the housing;
    making a modification to a projection specification of the first image projected onto the print medium;
    making a modification to a printing specification of a second image to be formed on the print medium based on modification information regarding the modification made to the projection specification; and
    printing the second image on the print medium set on the set unit by ejecting ink from the ejection head.

12. The printing method as recited in claim 11, further comprising printing the second image on the print medium according to the modified printing specification.

* * * * *